United States Patent
Smith et al.

(10) Patent No.: US 11,966,850 B1
(45) Date of Patent: Apr. 23, 2024

(54) SYSTEMS AND METHODS FOR TRAINING PREDICTIVE MODELS THAT IGNORE MISSING FEATURES

(71) Applicant: Unlearn.AI, Inc., San Francisco, CA (US)

(72) Inventors: Aaron Michael Smith, Corte Madera, CA (US); Charles Kenneth Fisher, Truckee, CA (US); Franklin D. Fuller, San Francisco, CA (US)

(73) Assignee: Unlearn.AI, Inc., San Francisco, CA (US)

( * ) Notice: Subject to any disclaimer, the term of this patent is extended or adjusted under 35 U.S.C. 154(b) by 0 days.

(21) Appl. No.: 18/332,629

(22) Filed: Jun. 9, 2023

Related U.S. Application Data

(60) Provisional application No. 63/486,429, filed on Feb. 22, 2023.

(51) Int. Cl.
*G06N 3/096* (2023.01)

(52) U.S. Cl.
CPC .................. *G06N 3/096* (2023.01)

(58) Field of Classification Search
CPC .............. G06N 3/096; G06F 18/00
See application file for complete search history.

(56) References Cited

U.S. PATENT DOCUMENTS

| | | |
|---|---|---|
| 7,634,464 B2 | 12/2009 | Chen et al. |
| 9,495,582 B2 | 11/2016 | Guissin et al. |
| 11,120,528 B1 * | 9/2021 | Seely ............ G06T 5/002 |
| 11,196,656 B1 | 12/2021 | Jain et al. |
| 11,200,511 B1 | 12/2021 | London |
| 11,501,429 B2 | 11/2022 | Stamatoyannopoulos et al. |

(Continued)

FOREIGN PATENT DOCUMENTS

| | | |
|---|---|---|
| CN | 111758108 A | 10/2020 |
| EP | 3740908 A1 | 11/2020 |

(Continued)

OTHER PUBLICATIONS

José M. Jerez, Ignacio Molina, Pedro J. García-Laencina, Emilio Alba, Nuria Ribelles, Miguel Martín, Leonardo Franco, Missing data imputation using statistical and machine learning methods in a real breast cancer problem, Artificial Intelligence in Medicine, vol. 50, Issue 2 (Year: 2010).*

(Continued)

*Primary Examiner* — Fayyaz Alam
(74) *Attorney, Agent, or Firm* — KPPB LLP

(57) ABSTRACT

Systems and methods for training and utilizing predictive models that ignore missing features in accordance with embodiments of the invention are illustrated. One embodiment includes a method for generating representations of inputs with missing values. The method includes steps for, at a single layer in a multi-layer model, receiving an input includes a set of one or more values for several features and identifying a missingness pattern of the input, wherein the missingness pattern indicates whether the set of values is missing a value for each of the several features. The method further includes determining a set of one or more transformation weights based on the missingness pattern and transforming the input based on the determined transformation weights.

16 Claims, 6 Drawing Sheets

(56) References Cited

U.S. PATENT DOCUMENTS

| | | | |
|---|---|---|---|
| 11,574,462 | B1* | 2/2023 | Bhatia ........................ G06T 3/40 |
| 11,610,126 | B1 | 3/2023 | Heckerman et al. |
| 11,636,309 | B2 | 4/2023 | Fisher et al. |
| 2004/0059696 | A1 | 3/2004 | Kropaczek et al. |
| 2005/0047646 | A1 | 3/2005 | Jojic et al. |
| 2011/0116522 | A1 | 5/2011 | Riggs et al. |
| 2013/0311968 | A1 | 11/2013 | Sharma |
| 2014/0279777 | A1 | 9/2014 | Cornebise et al. |
| 2015/0185716 | A1 | 7/2015 | Wichmann et al. |
| 2016/0217384 | A1 | 7/2016 | Leonard et al. |
| 2017/0091615 | A1 | 3/2017 | Liu et al. |
| 2017/0161635 | A1 | 6/2017 | Oono et al. |
| 2017/0255871 | A1 | 9/2017 | Macready et al. |
| 2017/0364043 | A1 | 12/2017 | Ganti et al. |
| 2017/0364803 | A1 | 12/2017 | Calmon et al. |
| 2017/0372193 | A1 | 12/2017 | Mailhe et al. |
| 2018/0081914 | A1* | 3/2018 | Zoll ........................ G06F 11/3452 |
| 2018/0082172 | A1 | 3/2018 | Patel et al. |
| 2018/0150728 | A1 | 5/2018 | Vahdat |
| 2018/0204138 | A1 | 7/2018 | Nugent |
| 2018/0299152 | A1 | 10/2018 | Libal et al. |
| 2018/0314573 | A1 | 11/2018 | Chang et al. |
| 2018/0316781 | A1 | 11/2018 | Salem |
| 2018/0336319 | A1 | 11/2018 | Itu et al. |
| 2019/0018933 | A1 | 1/2019 | Oono et al. |
| 2019/0130281 | A1 | 5/2019 | Yang et al. |
| 2019/0220733 | A1 | 7/2019 | Fisher et al. |
| 2019/0244680 | A1 | 8/2019 | Rolfe et al. |
| 2019/0283247 | A1 | 9/2019 | Chang et al. |
| 2019/0303471 | A1 | 10/2019 | Lee et al. |
| 2019/0303798 | A1 | 10/2019 | Xie et al. |
| 2020/0143498 | A1 | 5/2020 | Alkan et al. |
| 2020/0401916 | A1 | 12/2020 | Rolfe et al. |
| 2021/0117842 | A1 | 4/2021 | Smith et al. |
| 2021/0241139 | A1 | 8/2021 | Jain et al. |
| 2021/0256453 | A1 | 8/2021 | Morgan et al. |
| 2022/0003894 | A1 | 1/2022 | Shapiro et al. |
| 2022/0051796 | A1 | 2/2022 | Zhu et al. |
| 2022/0121955 | A1 | 4/2022 | Chavoshi et al. |
| 2022/0172085 | A1 | 6/2022 | Fisher et al. |
| 2022/0187776 | A1 | 6/2022 | Bagne |
| 2022/0188601 | A1 | 6/2022 | Adler et al. |
| 2022/0300329 | A1 | 9/2022 | Abhishek Raja |
| 2022/0410385 | A1 | 12/2022 | Shimura |
| 2023/0004796 | A1 | 1/2023 | Mayer et al. |
| 2023/0118864 | A1 | 4/2023 | Zhang et al. |
| 2023/0209035 | A1* | 6/2023 | Kaabi ...................... G06T 5/005 348/46 |
| 2023/0245258 | A1 | 8/2023 | Ma et al. |
| 2023/0245777 | A1* | 8/2023 | Foschini ................ G16H 50/20 705/2 |

FOREIGN PATENT DOCUMENTS

| | | |
|---|---|---|
| EP | 4256418 A2 | 10/2023 |
| JP | 2021511584 A | 5/2021 |
| JP | 202231730 A | 2/2022 |
| JP | 7305656 B2 | 6/2023 |
| WO | 0229556 A2 | 4/2002 |
| WO | 2014114295 A1 | 7/2014 |
| WO | 2016145379 A1 | 9/2016 |
| WO | 2019143737 A1 | 7/2019 |
| WO | 2020115487 A1 | 6/2020 |
| WO | 2021077097 A1 | 4/2021 |
| WO | 2022003528 A1 | 1/2022 |
| WO | 2022120350 A2 | 6/2022 |
| WO | 2022125806 A1 | 6/2022 |
| WO | 2022120350 A3 | 8/2022 |
| WO | 2022210425 A1 | 10/2022 |
| WO | 2022261420 A1 | 12/2022 |
| WO | 2019143737 A8 | 3/2023 |

OTHER PUBLICATIONS

Lipton ZC, Kale DC, Wetzel R. Modeling missing data in clinical time series with mns. Machine Learning for Healthcare. Jun. 13, 2016;56(56):253-70. (Year: 2016).*

Extended European Search Report for European Application No. 19741291.9, Search completed Sep. 8, 2021, dated Sep. 17, 2021, 12 Pgs.

International Preliminary Report on Patentability for International Application PCT/US2019/013870 Report dated Jul. 21, 2020, dated Jul. 30, 2020, 4 Pgs.

International Preliminary Report on Patentability for International Application PCT/US2020/056354, Report dated Apr. 19, 2022, dated Apr. 28, 2022, 05 Pgs.

International Preliminary Report on Patentability for International Application PCT/US2021/072678, Report dated May 30, 2023, dated Jun. 15, 2023, 08 Pgs.

International Search Report and Written Opinion for International Application No. PCT/US2019/013870, Search completed Mar. 18, 2019, dated Mar. 27, 2019, 9 Pgs.

International Search Report and Written Opinion for International Application No. PCT/US2020/056354, Search completed Dec. 21, 2020, dated Jan. 25, 2021, 09 pgs.

International Search Report and Written Opinion for International Application No. PCT/US2023/069016, Search completed Sep. 18, 2023, dated Oct. 18, 2023, 11 Pgs.

International Search Report and Written Opinion for International Application No. PCT/US2023/070276, Search completed Oct. 6, 2023, dated Nov. 8, 2023, 16 Pgs.

International Search Report and Written Opinion for International Application PCT/US2021/072678, search completed Jan. 31, 2022, dated Jul. 1, 2022, 13 Pgs.

Akhtar et al., "Improving the Robustness of Neural Networks Using K-Support Norm Based Adversarial Training", IEEE Access; Publication [online]. Dec. 28, 2016, pp. 1-10.

Allison, "Handling Missing Data by Maximum Likelihood", SAS Global Forum 2012: Statistics and Data Analysis, 21 pages.

Amin et al., "Quantum Boltzmann Machine", [retrieved on Jun. 10, 2023]. Retrieved from the Internet: <URL:https://journals.aps.org/prx/pdf/10.1103/PhysRevX.8.021050>, May 23, 2018, pp. 021050-1 to 021050-11.

Arici et al., "Associative Adversarial Networks", arXiv: 1611. 06953v1 [cs.LG], Nov. 18, 2016, 8 pgs. <URL:https://arxiv.org/abs/1611. 06953>.

Arjovsky et al., "Wasserstein GAN", arXiv: 1701.07875v1 [stat. ML], Jan. 26, 2017, 30 pgs.

Bengio, et al., "Greedy Layer-Wise Training of Deep Networks", Advances in Neural Information Processing Systems, 2007, 13 pgs.

Chatterjee et al., "Explaining Complex Distributions with Simple Models", 2008. Econophysics. pp. 1-15.

Cho et al., "Gaussian-Bernoulli deep Boltzmann machine", Proceedings of the 2013 International Joint Conference on Neural Networks (IJCNN), Dallas, Texas, Aug. 4-9, 2013, 9 pgs.

Duan et al., "Utilizing dynamic treatment information for MACE prediction of acute coronary syndrome", 2019, BMC Medical Informatics and Decision Making, pp. 1-11 (Year: 2019).

Dutt et al., "Generative Adversarial Networks (GAN) Review", CVR Journal of Science and Technology, Dec. 2017, vol. 13, pp. 1-5.

Fisher et al., "Boltzmann Encoded Adversarial Machines", arxiv. org:1804.08682v1, Apr. 23, 2018, XP081229135, 17 pgs.

Fisher et al., "Machine Learning for Comprehensive Forecasting of Alzheimer's Disease Progression", Sep. 20, 2019, Scientific Reports, pp. 1-41. (Year: 2019).

Gabrie et al., "Training Restricted Boltzmann Machines via the Thouless-Anderson-Palmer Free Energy", Advances in Neural Information PRocessing Systems, vol. 28, 2015, 9 pgs.

Goodfellow et al., "Generative Adversarial Nets", Advances in Neural Information Processing Systems, vol. 27, 2014, 9 pgs.

Goodfellow et al., "Multi-Prediction Deep Boltzmann Machines", [retrieved on Jun. 10, 2023]. Retrieved from the Internet: <URL:https://proceedings.neurips.cc/paper/2013/file/0bb4aec1710521c12ee76289d9440817-Paper.pdf> Dec. 5, 2013, pp. 1-9.

(56) References Cited

OTHER PUBLICATIONS

Graham et al., "Analysis with missing data in drug prevention research", NIDA Research Monograph, Feb. 1994, vol. 142, pp. 13-63.
Greydanus, "Generative Adversarial Networks for the MNIST dataset", "Mnist gan," http://github.com/greydanus/mnist-gan (2017), 2 pgs.
Grover et al., "Flow-GAN: Combining Maximum Likelihood and Adversarial Learning in Generative Models", arXiv:1705.08868, May 24, 2017, 10 pages.
Gupta, "Intention-to-treat concept: a review", Perspectives in Clinical Research, Jul. 2011, vol. 2, No. 3, pp. 109-112, doi: 10.4103/2229-3485.83221.
Herlau et al., "Bayesian Dropout", arXiv e-prints (2015): arXiv-1508.
Hinton, "A Practical Guide to Training Restricted Boltzmann Machines", University of Toronto, Technical Report UTML TR 2010-003, 2010, 21 pages. <URL: http://www.cs.toronto.edu/hinton/absps/guideTR.pdf>.
Hinton et al., "A Fast Learning Algorithm for Deep Belief Nets", Neural Computation 18, 1527-1554 (2006).
Hinton et al., "Reducing the Dimensionality of Data with Neural Networks", Science, vol. 313, No. 5786, Jul. 28, 2006, pp. 504-507.
Kim et al., "Deep Directed Generative Models with Energy-Based Probability Estimation", arXiv:1606.03439, Jun. 10, 2016, 9 pages. <URL: https://arxiv.org/abs/1606.03439>.
Kullback et al., "On Information and Sufficiency", The Annals of Mathematical Statistics, vol. 22, No. 1, 1951, pp. 79-86.
Lamb et al., "GibbsNet: Iterative Adversarial Inference for Deep Graphical Models", arXiv preprint arXiv:1712.04120v1, 2017, 11 pages.
Li et al., "Temperature based Restricted Boltzmann Machines", Scientific Reports Jan. 13, 2016, vol. 19133, 12 pgs., DOI:10.1038/srep 19133.
Lim et al., "Time-Series Forecasting with Deep Learning: A Survey", Jul. 28, 2021, The Royal Society Publishing, pp. 1-14 (Year: 2021).
Liu et al., "A Survey of Deep Neural Network Architectures and their Applications", Neurocomputing, Apr. 19, 2017, vol. 234, pp. 11-26, XP029916222, ISSN: 0925-2312, DOI: 10.1016/J.NEUCOM.2016.12.038.
Liu et al., "Image inpainting for irregular holes using partial convolutions", Proceedings of the European conference on computer vision (ECCV), 2018, pp. 85-100.
Lopez-Ruiz et al., "Equiprobability, Entropy, Gamma Distributions and Other Geometrical Questions in Multi-Agent Systems", Entropy, 2009, vol. 11, pp. 959-971, doi:10.3390/e11040959.
Marlin et al., "Recommender systems: Missing data and statistical model estimation", Proceedings of the Twenty-Second international joint conference on Artificial Intelligence, 2011, vol. Three (IJCAI'11), AAAI Press, pp. 2686-2691.
Miotto et al., "Deep Learning for Healthcare: Review, Opportunities and Challenges", Briefings in Bioinformatics, May 6, 2017 (May 6, 2017), vol. 19, No. 6, 11 pgs. GB, ISSN: 1467-5463, DOI: 10.1093/bib/bbx044.
Montavon et al., "Wasserstein Training of Restricted Boltzmann Machines", Advances in Neural Information Processing Systems, vol. 29, 2016, 9 pgs.
Nguyen et al., "Latent Patient Profile Modelling and Applications with Mixed-Variate Restricted Boltzmann Machine", Advances in Knowledge Discovery and Data Mining, 2013, pp. 123-135.
Nguyen et al., "Supervised Restricted Boltzmann Machines", UAI. 2017, 10 pgs.
Niu et al., "A review on the attention mechanism of deep learning", Neurocomputing, vol. 452, 2021, pp. 48-62, https://doi.org/10.1016/j.neucom.2021.03.091.
Rogers et al., "Combining patient-level and summary-level data for Alzheimer's disease modeling and simulation: a beta regression meta-analysis", Journal of Pharmacokinetics and Pharmacodynamics 39.5 (2012), 20 pgs.
Salakhutdinov et al., "Deep Boltzmann Machines", Proc. International Conference on Artificial Intelligence and Statistics, 2009, pp. 448-455.
Silva et al., "Predicting In-Hospital Mortality of ICU Patients: The PhysioNet/Computing in Cardiology Challenge 2012", Computing in Cardiology, 2012, vol. 39, pp. 245-248.
Song et al., "Generative Adversarial Learning of Markov Chains", Accessed at URL https://openreview.net/forum?id=S1L-hCNtl, 2017, 7 Pages.
Sterne et al., "Multiple imputation for missing data in epidemiological and clinical research: potential and pitfalls", BMJ, 2009, pp. 338, doi: https://doi.org/10.1136/bmj.b2393 (Published Jun. 29, 2009).
Sutskever et al., "The Recurrent Temporal Restricted Boltzmann Machine", Advances in Neural Information Processing Systems, 2009, pp. 1601-1608.
Tan et al., "A tensor-based method for missing traffic data completion", Transportation Research Part C: Emerging Technologies, vol. 28, 2013, pp. 15-27, https://doi.org/10.1016/j.trc.2012.12.007.
Tipirneni et al., "Self-supervised transformer for sparse and irregularly sampled multivariate clinical time-series", ACM Transactions on Knowledge Discovery from Data (TKDD), 2022, vol. 16, No. 6, pp. 1-17.
Tran et al., "Mixed-Variate Restricted Boltzmann Machines", Asian Conference on Machine Learning, JMLR: Workshop and Conference Proceedings 20, 2011, pp. 213-229.
Yi et al., "ST-MVL: Filling Missing Values in Geo-Sensory Time Series Data", Proceedings of the Twenty-Fifth International Joint Conference on Artificial Intelligence, 2016, pp. 2704-2710.Kan.
Yu et al., "Assessment and adjustment of approximate inference algorithms using the law of total variance", arXiv preprint arXiv:1911.08725, Nov. 2019 [online], [retrieved on Jan. 31, 2022].
Zhang et al., "Predictive Deep Boltzmann Machine for Multiperiod Wind Speed Forecasting", IEEE Transactions on Sustainable Energy, 2015, vol. 6, Issue 4, pp. 1416-1425, doi: 10.31109/TSTE.2015.244387.
Zhu et al., "Physics-Constrained Deep Learning for High-dimensional Surrogate Modeling and Uncertainty Quantification without Labeled Data", arXiv preprint arXiv:1901.06314 (2019).

\* cited by examiner

SYSTEMS AND METHODS FOR TRAINING PREDICTIVE MODELS THAT IGNORE MISSING FEATURES

CROSS-REFERENCE TO RELATED APPLICATIONS

The current application claims the benefit of and priority under 35 U.S.C. § 119(e) to U.S. Provisional Patent Application No. 63/486,429 entitled "Systems and Methods for Training Predictive Models that Ignore Missing Features" filed Feb. 22, 2023. The disclosure of U.S. Provisional Patent Application No. 63/486,429 is hereby incorporated by reference in its entirety for all purposes.

FIELD OF THE INVENTION

The present invention generally relates to training and using predictive models and, more specifically, training and using predictive models that ignore missing features.

BACKGROUND

Machine Learning (ML) models are used in many settings to predict responses from observed input features. A textbook example of an ML problem is to classify an object, given an image of the object. Should some of the pixels in the image be obscured, rendering their intensity unknown, the object classification problem becomes more difficult. Missing/incomplete features (obscured pixels in the case of an image) challenge ML models in many disciplines.

SUMMARY OF THE INVENTION

Systems and methods for training and utilizing predictive models that ignore missing features in accordance with embodiments of the invention are illustrated. One embodiment includes a method for generating representations of inputs with missing values. The method includes steps for, at a single layer in a multi-layer model, receiving an input includes a set of one or more values for several features and identifying a missingness pattern of the input, wherein the missingness pattern indicates whether the set of values is missing a value for each of the several features. The method further includes determining a set of one or more transformation weights based on the missingness pattern and transforming the input based on the determined transformation weights.

In a further embodiment, determining a set of transformation weights based on the missingness pattern includes utilizing a set of one or more attention weights.

In still another embodiment, the missingness pattern is a binary vector.

In a still further embodiment, transforming the input is further based on an offset that depends on the missingness pattern.

In yet another embodiment, determining the set of transformation weights includes scaling the set of transformation weights.

In a yet further embodiment, transforming the input includes linearly mixing the missingness pattern with a fixed linear transformation.

In another additional embodiment, the method further includes steps for updating a model based on the transformed input.

In a further additional embodiment, the method further includes steps for generating a predictive output based on the transformed input.

One embodiment includes a non-transitory machine readable medium containing processor instructions for generating representations of inputs with missing values. Execution of the instructions by a processor causes the processor to perform a process that includes, at a single layer in a multi-layer model, receiving an input includes a set of one or more values for several features and identifying a missingness pattern of the input. The missingness pattern indicates whether the set of values is missing a value for each of the several features. The process further includes determining a set of one or more transformation weights based on the missingness pattern and transforming the input based on the determined transformation weights.

One embodiment includes a method for generating representations of inputs with missing values. The method includes steps for receiving an input includes a set of one or more values for several features, wherein the set of values for at least one of the several features includes values for each of several points in time, and for identifying a missingness pattern of the input, wherein the missingness pattern for the at least one feature indicates whether the set of values is missing a value for each of the several points in time. The method further includes steps for determining a set of one or more transformation weights based on the missingness pattern, and transforming the input based on the determined transformation weights.

In another embodiment again, determining a set of transformation weights based on the missingness pattern includes utilizing a set of one or more attention weights.

In a further embodiment again, utilizing a set of attention weights includes determining the set of attention weights using a set of one or more neural networks.

In still yet another embodiment, the missingness pattern is a binary vector.

In a still yet further embodiment, transforming the input is further based on an offset that depends on the missingness pattern.

In still another additional embodiment, determining the set of transformation weights includes scaling the set of transformation weights.

In a still further additional embodiment, transforming the input includes linearly mixing the missingness pattern with a fixed linear transformation.

In still another embodiment again, the method further includes steps for updating a model based on the transformed input.

In a still further embodiment again, the method further includes steps for generating a predictive output based on the transformed input.

One embodiment includes a non-transitory machine readable medium containing processor instructions for generating representations of inputs with missing values. Execution of the instructions by a processor causes the processor to perform a process that comprises receiving an input includes a set of one or more values for several features, wherein the set of values for at least one of the several features includes values for each of several points in time, and identifying a missingness pattern of the input, wherein the missingness pattern for the at least one feature indicates whether the set of values is missing a value for each of the several points in time. The process further includes determining a set of one or more transformation weights based on the missingness pattern, and transforming the input based on the determined transformation weights.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
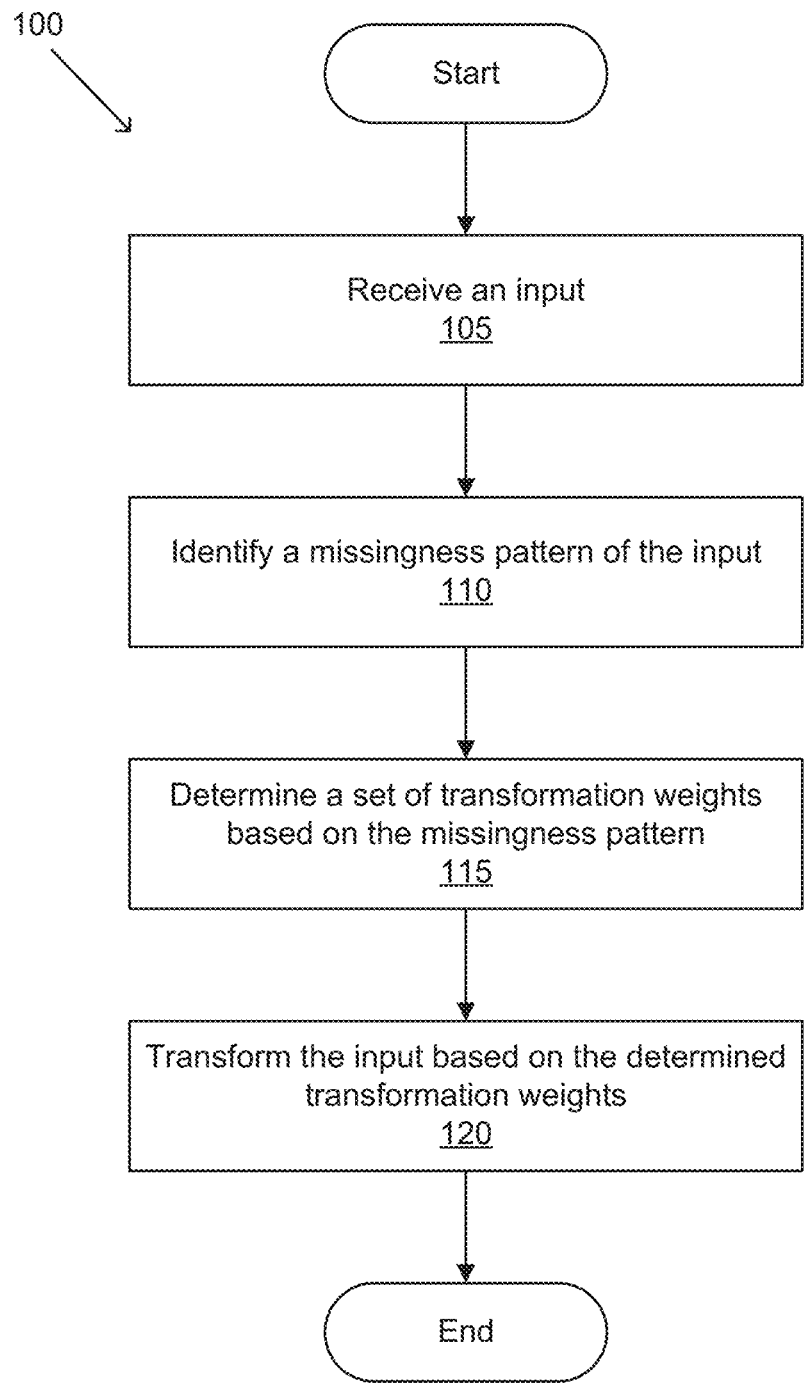
FIG. 1 conceptually illustrates an example of a process for generating dense representations of inputs with missing values.

Turning now to the drawings, systems and methods in accordance with many embodiments of the invention can train and utilize models with incomplete data by converting data with missing features to dense feature-complete representations. Models that can utilize data with missing values for features (or MissAttention models) can be trained to learn not only from the values that are present, but from the missingness of the values for different features.

In many cases, the features that are missing for a given observation varies randomly and the distribution of missing features may be itself informative. In recommendation problems, where the objective is to make personalized recommendations for individual users, voluntarily supplied features like user ratings and surveys can be important features to use. Voluntarily supplied features are often highly incomplete. In clinical trials, the aim is to predict a patient's disease progression based on a variety of scheduled tests, but some sub-studies may opt to skip some tests and participants in the trial might miss scheduled visits. Consequently, clinical trial datasets are rife with missing features. Even in the realm of sensor data analysis, where data is more reliably complete, there are examples of missing data that arise due communication and sensor failures.

The common approach to handle data with missing values is to "impute" values so that the dataset can be made complete before a second, separately trained model is applied to the imputed dataset. In contrast to the commonly employed approach, the second approach is to create a single model which can handle incomplete data. Systems and methods in accordance with certain embodiments of the invention create a single model which can handle incomplete data, thus following this second approach.

In a variety of embodiments, models can be deterministic (not random) and can be formulated with a neural network layer that is used to convert data with missing features to dense feature-complete representations. As a neural network layer, it can be broadly compatible with a wide range of neural network approaches. Systems and methods in accordance with certain embodiments of the invention are deterministic and can be readily combined with other neural network methods, as they are encapsulated as a neural network layer.

Systems and methods in accordance with some embodiments of the invention provide several benefits over existing methods and processes. For example, by utilizing a missingness pattern, rather than simply the features which are present, processes in accordance with a number of embodiments of the invention can modify the bias term based on the missingness of different sets of features. Other methods may attempt to create a dense representation based solely on the observed features, but such processes are unable to derive information from the points which are missing. Processes in accordance with various embodiments of the invention also allow for dense representations to be generated from a light weight, nearly linear layer and can be readily applied to continuous and/or discrete spaces. Although many of the examples described herein describe implementations in a single layer of a neural network, one skilled in the art will recognize that similar systems and methods can be implemented in two or more layers of one or more neural networks in various configurations, without departing from this invention.

In many realistic problem settings, features that are missing are as important as those that are observed. For instance, in clinical trials, a visit may be skipped because the patient is too ill or a test may be skipped due to a different standard of care at that particular health care facility. In either case, which tests or visits are missed may be by itself predictive of certain outcomes. Thus, systems and methods in accordance with a variety of embodiments of the invention allow for the pattern of missing features to impact the output of the neural network layer as much as the values which are observed. Borrowing the concept of "attention" from the image analysis and natural language processing communities, where certain emphasis or attention is preferentially placed on words or image regions, processes in accordance with many embodiments of the invention apply an emphasis or attention that depends on which features are missing.

Data is often incomplete, with some event records having more data present than others. Many machine learning methods, however, expect dense and complete input data. Systems and methods in accordance with a number of embodiments of the invention utilize a neural network layer (or MissAttention layer) to transform incomplete data to a complete, dense representation in such a way that the MissAttention layer can be easily co-trained with other layers in a neural network. The approach is computationally efficient, similar in complexity to a linear layer, and can serve a wide range of application areas from tabular data to sensor data to time series data. This scaling is significant, since other approaches are substantially more expensive. For example, in a mixture of experts approach, as the dimensionality M of x grows, the number of cases grows as $2^M$, which is not tractable. 30 dimensions would require over a billion experts. In contrast, MissAttention scales quadratically in space and time with respect to input dimension.

An example of a process for generating dense representations of inputs with missing values is conceptually illustrated in FIG. 1. In certain embodiments, processes for generating dense representations can be performed in a single layer of a model. Process 100 receives (105) an input. Inputs in accordance with numerous embodiments of the invention can include various types of data, such as (but not limited to) medical data, time-series data, marketing data, etc. In several embodiments, inputs include values for each of several different features, where each particular input may be missing values for one or more of the features.

Process 100 identifies (110) a missingness pattern based on the input. Missingness patterns in accordance with some embodiments of the invention indicate whether values are missing for the different features. In numerous embodiments, missingness patterns are represented as binary vectors.

Process 100 determines (115) a set of transformation weights based on the missingness pattern. Transformation weights in accordance with several embodiments of the invention are a weighting vector that depends on the missingness pattern of the inputs. In many embodiments, transformation weights can be scaled based on the missingness pattern. In various embodiments, the rows and/or columns of a fixed linear transformation can be scaled. Determining the set of transformation weights in accordance with numerous embodiments of the invention can include linearly mixing a fixed linear transformation with the missingness pattern.

Process 100 transforms (120) the input based on the determined transformation weights. In certain embodiments, transforming inputs is further based on an offset that can be determined based on the missingness pattern.

In numerous embodiments, processes for generating dense outputs can be used to train and/or utilize a model (e.g., a predictive model) when the training (or input) data may be missing values for features in the data set. Processes in accordance with some embodiments of the invention can update a model (or learn) based on transformed inputs.

While specific processes for generating dense representations of inputs with missing values are described above, any of a variety of processes can be utilized to generate dense representations as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

Systems and methods in accordance with some embodiments of the invention can ingest data with missing features and produce from it a representation free of missing features. In some embodiments, dense representations can be produced through a MissAttention "layer." MissAttention layers in accordance with several embodiments of the invention are compatible with neural network software frameworks like PyTorch, Tensorflow, MXNet and the like. In some embodiments, ingested data and/or dense representations can be include time series tabular data. In various embodiments, parameters of the MissAttention "layer" can be co-trained alongside other layers. In several embodiments, processes can optimize the initialization of weights for training MissAttention layers.

A. MissAttention Layer

Figure 2:
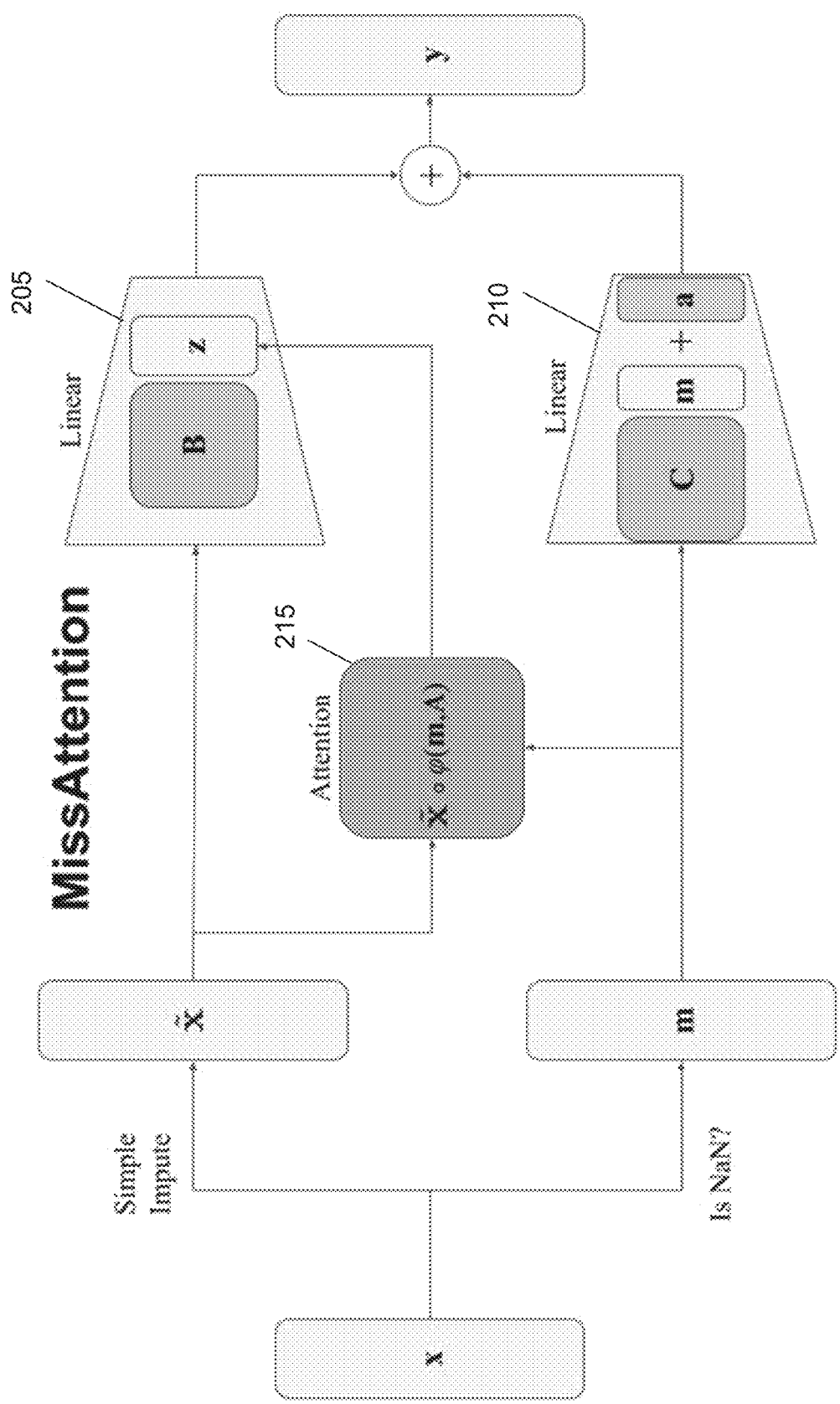
FIG. 2 illustrates an example diagram of a MissAttention layer design in accordance with an embodiment of the invention.

An example diagram of a MissAttention layer design in accordance with an embodiment of the invention is illustrated in FIG. 2. In this example, data flows from left to right, beginning with input x. The trapezoidal shapes 205 and 210 depict linear layers. Attention 215 based on the missing mask m modifies the weights of the upper data flow path. In this example, a "simple impute" is performed on the input x Imputation in accordance with numerous embodiments of the invention can include various strategies, such as (but not limited to) zero filling, mean filling, back-filling, etc.

In a variety of embodiments, processes for producing a representation of the data that lacks missing features is encapsulated as neural network "layer". Layers are modular components which can be reused in different neural networks. MissAttention layers in accordance with many embodiments of the invention can be built using linear transformations and/or element-wise non linearities, which are readily available in many neural network software frameworks. In various embodiments, the forward pass of a MissAttention layer produces an output vector $y \in \mathbb{R}^N$ from some input $x \in \mathbb{R}^M$. In numerous embodiments, MissAttention layers can be given by a linear transformation of x (e.g., equation 3), where the weights of the transformation depend on the missingness pattern of x. Processes in accordance with some embodiments of the invention indicate missing elements of x through an indicator variable m, where $m_i=1$ when $x_i$ is missing and $m_j=0$ when $x_j$ is not missing. The transform is parameterized by $C \in \mathbb{R}^{N \times M}$, $A \in \mathbb{R}^{M \times M}$ and $B \in \mathbb{R}^{N \times M}$, and a bias term $a \in \mathbb{R}^N$:

$$y = a + Cm + B\left(\underbrace{(x \circ (1-m))}_{\tilde{x}} \circ \varphi(Am)\right) \tag{1}$$

$$= a + Cm + B(\tilde{x} \circ \varphi(Am)) \tag{2}$$

$$= a + Cm + B\mathrm{diag}(\varphi(Am))\tilde{x} \tag{3}$$

where in the above, $\tilde{x}$ is the zero-imputed version of x. Here ∘ indicates an element-wise product and diag(v) indicates a diagonal matrix with diagonal elements given by the vector argument v. φ is a potentially non-linear function that is applied to the elements of Am elementwise. Therefore φ(Am) is a weighting vector that depends on the missingness pattern of x. The function φ can include (but is not limited to) the exponential function and/or softmax. In a variety of embodiments, the term Cm adds an offset the purely depends on the missing pattern in x, and a is a pure bias term.

Stacking the input vectors x into a matrix X, the missing indicators as M, and the outputs as Y, the layer's operation can be written as, $$Y = a + CM + B(\varphi(AM) \circ \tilde{X}). \tag{4}$$

In the database-inspired language of attention, A is the matrix of keys, M the matrix of queries, and $\tilde{X}$ the values.

In certain embodiments, missAttention layers can be formulated as follows:

$$y^{(1)} = a + Cm + \mathrm{diag}(\varphi_1(A_1 m))B\,\mathrm{diag}(\varphi_2(A_2 m))\tilde{x}$$

$$y^{(2)} = a + Cm + B\,\mathcal{K}_{(m,x)}\tilde{x}$$

The first extension, denoted $y^{(1)}$, adds an additional diagonal missingness-dependent term $\mathrm{diag}(\varphi_1)$. The effect of this is to scale the rows of the otherwise fixed linear transformation B, while diag($\varphi_2$) exists to scale the columns. In the second case, $y^{(2)}$, we consider a matrix-valued function $\mathcal{K}$, such as the soft-max kernel or squared exponential kernel, which accepts the missingness vector m and the input with missingness x as arguments. This generalization allows the missingness vector linearly mix B, instead of simply scaling its rows and/or columns.

B. Scalability of MissAttention

Systems and methods in accordance with several embodiments of the invention provide a computationally efficient approximation for estimating the response y given x. To illustrate the efficiency of MissAttention, note that other more straight-forward solutions to the problem of missing data fail to scale to higher dimensional problems. Consider a simple linear regression problem, with a zero-centered continuous response y that depends on two inputs a and b. Denote all observations as y and all the training inputs as x=[a,b]. With only two inputs, 4 linear models can be enumerated, each optimal for the different missing input possibilities. Using the same notation as above, denote a missing response m=[1,0] to indicate a is missing and m=[0,1] for when b is missing. The four possible missing states are {[1,0], [0,1], [1,1], [0,0]}. The best linear model for each case is:

$$y = \begin{cases} \frac{\text{cov}(y, b)}{\text{var}(b)} b & \text{given } m = [1, 0] \\ \frac{\text{cov}(y, a)}{\text{var}(a)} a & \text{given } m = [0, 1] \\ 0 & \text{given } m = [1, 1] \\ \frac{\text{var}(b)\text{cov}(y, a) - \text{cov}(a, b)\text{cov}(b, y)}{\text{var}(a)\text{var}(b) + \text{cov}^2(a, b)} a + \frac{\text{var}(a)\text{cov}(y, b) - \text{cov}(a, b)\text{cov}(a, y)}{\text{var}(a)\text{var}(b) + \text{cov}^2(a, b)} b & \text{given } m = [0, 0] \end{cases}$$

Such a model is a mixture of experts, with each expert specializing in a different missingness pattern. As the dimensionality M of x grows, however, the number of cases grows as $2^M$, which is not tractable. 30 dimensions would require over a billion experts. In contrast, MissAttention scales quadratically in space and time with respect to input dimension.

C. Systems and Methods for Extension to Time Series Tabular Data

Figure 3:
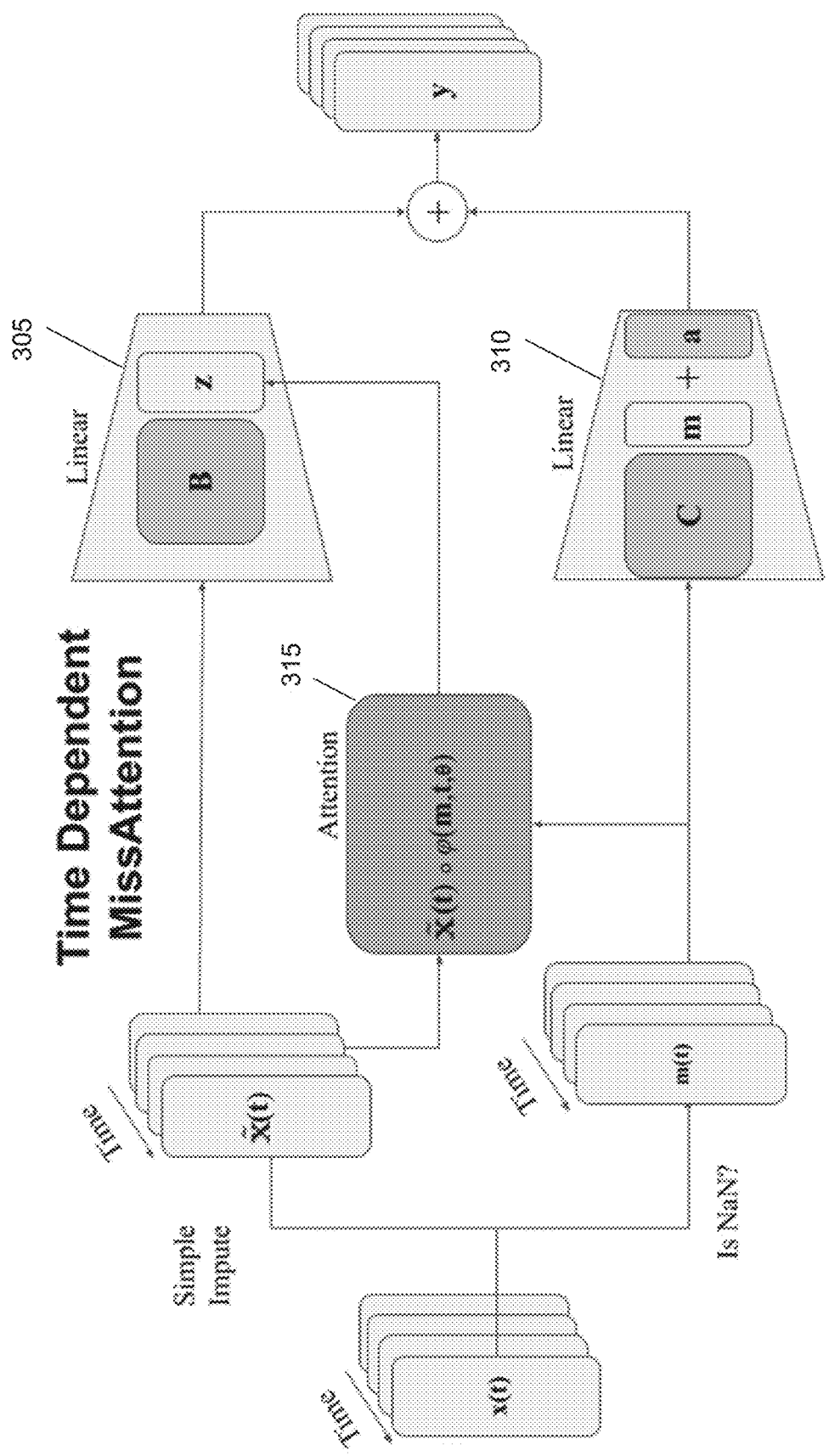
FIG. 3 illustrates an example diagram of a MissAttention layer design in accordance with an embodiment of the invention.

Time is a common index dimension encountered in tabular data. For instance, subjects arriving to a clinical trial appear at multiple times. Businesses that report earnings and various financials also report results on a cadence. A diagram of an example of Time Dependent MissAttention layer design is illustrated in FIG. 3. Data flows from left to right, beginning with input x(t). The trapezoidal shapes 305 and 310 in this example depict linear layers, where it can be seen that attention 315 modifies the representation of the data affected by the upper linear layer based on the missing mask m(t). "Simple Impute" in accordance with many embodiments of the invention can refer to various strategies, such as (but not limited to) zero filling (featured in equation 2), mean filling, back-filling, etc. Note that in the case of time dependent miss-attention, the attention weight $\varphi$ may no longer be a simple function. In a number of embodiments, attention weights are time-dependent neural networks that depend on a missingness pattern as a function of time and the parameters of the network $\theta$.

To handle such data, MissAttention can be generalized as follows:

$$y(t) = a + Cm(t) + B\underbrace{((x(t) \circ (1 - m(t))))}_{\tilde{x}(t)} \circ \varphi(m(t), \theta, t))$$

where y(t), m(t), $\varphi$( . . . , t) are respectively the multivariate feature representation, missingness pattern, and/or attention weights which can depend on time. The time dependence may be itself encoded as a neural network or as a fixed parameterization if the time steps are known and fixed in advance.

D. Systems and Methods for Optimal Co-Training of MissAttention

A key consideration for neural network layers is how the parameters of the layer are initialized. In various embodiments, parameters of a MissAttention layer can be initialized to optimize training of the layer. For a centered observable y, the desired output may be zero when all elements of m are 1, because in this case, nothing is known and the mean should be reported. Given the simplified form y=a+Cm+B($\tilde{x} \circ \varphi$(Am)), when m=1, each row of C should sum to $-a_j$, since $\tilde{x}$ will zero out the third term. If the bias term is initialized to zero, then each row of C should sum to zero. Notice that if all elements of A, within the $\varphi$ term, are negative, then $\varphi$ will be close to zero for all rows. This would push the response of all output rows towards zero, which would be a good initialization for a centered observable.

Initializing weights in accordance with a variety of embodiments of the invention can include:
 Initializing C randomly such that all rows sum to zero;
 Initializing a to zero;
 Initializing A to random, strictly negative values, when non-linearity of $\sigma$-results in positive only values; and
 Requiring $\varphi$ to take value 1 when all values of m are zero.

While a specific process for initializing a MissAttention layer in accordance with several embodiments of the invention is described above, any of a variety of processes can be utilized to initialize layers as appropriate to the requirements of specific applications. In certain embodiments, steps may be executed or performed in any order or sequence not limited to the order and sequence shown and described. In a number of embodiments, some of the above steps may be executed or performed substantially simultaneously where appropriate or in parallel to reduce latency and processing times. In some embodiments, one or more of the above steps may be omitted.

E. Systems for MissAttention

1. MissAttention System

Figure 4:
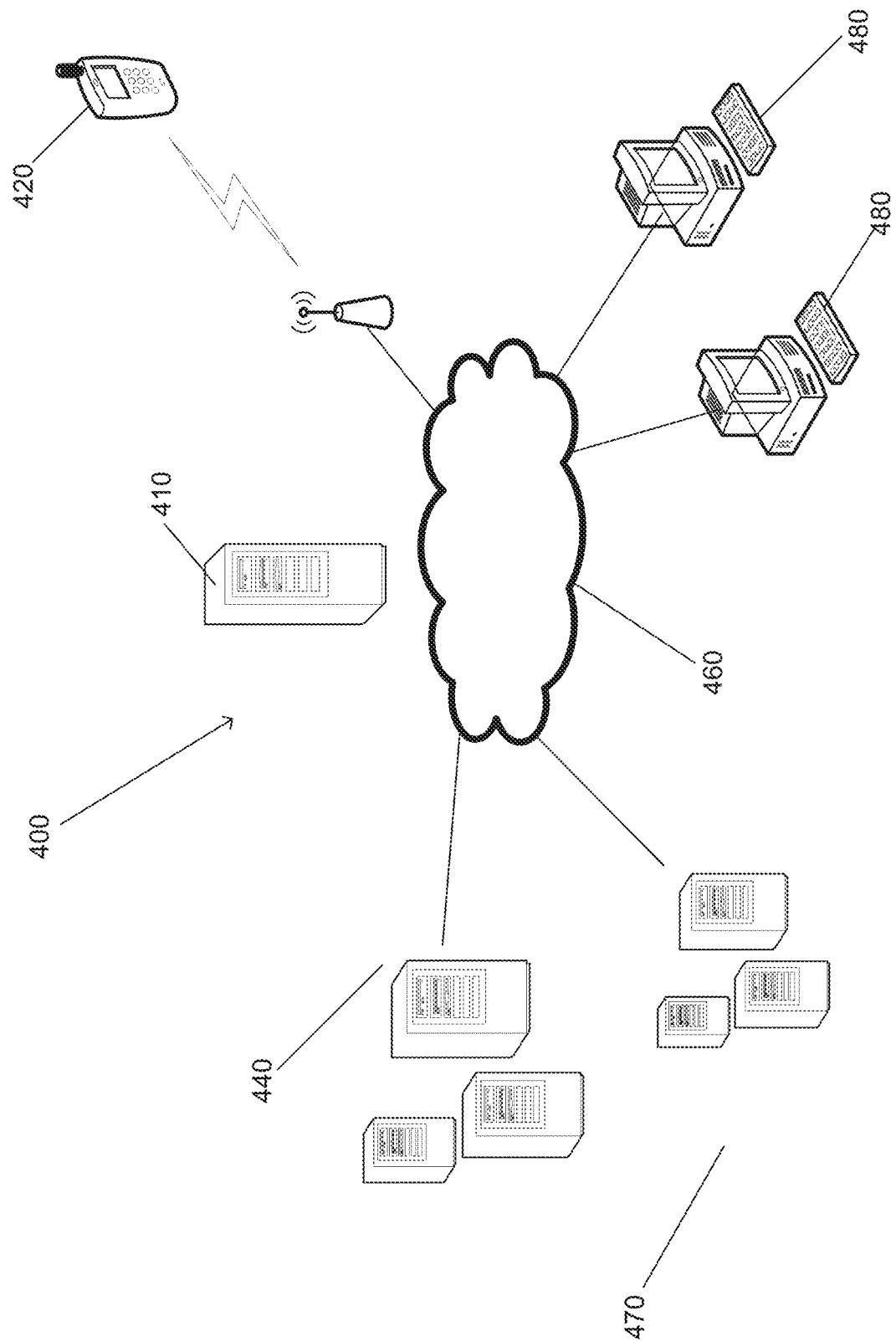
FIG. 4 illustrates an example of a MissAttention system that trains and/or utilizes models based on data with missing values in accordance with an embodiment of the invention.

An example of a MissAttention system that trains and/or utilizes models based on data with missing values in accordance with an embodiment of the invention is illustrated in FIG. 4. Network 400 includes a communications network 460. The communications network 460 is a network such as the Internet that allows devices connected to the network 460 to communicate with other connected devices. Server systems 410, 440, and 470 are connected to the network 460. Each of the server systems 410, 440, and 470 is a group of one or more servers communicatively connected to one another via internal networks that execute processes that provide cloud services to users over the network 460. One skilled in the art will recognize that a MissAttention system may exclude certain components and/or include other components that are omitted for brevity without departing from this invention.

For purposes of this discussion, cloud services are one or more applications that are executed by one or more server systems to provide data and/or executable applications to devices over a network. The server systems 410, 440, and 470 are shown each having three servers in the internal network. However, the server systems 410, 440 and 470 may include any number of servers and any additional number of server systems may be connected to the network 460 to provide cloud services. In accordance with various embodiments of this invention, a MissAttention system that uses systems and methods that train and/or utilize models based on data with missing values in accordance with an embodiment of the invention may be provided by a process being executed on a single server system and/or a group of server systems communicating over network 460.

Users may use personal devices 480 and 420 that connect to the network 460 to perform processes that train and/or utilize models based on data with missing values in accordance with various embodiments of the invention. In the shown embodiment, the personal devices 480 are shown as desktop computers that are connected via a conventional "wired" connection to the network 460. However, the personal device 480 may be a desktop computer, a laptop computer, a smart television, an entertainment gaming console, or any other device that connects to the network 460 via a "wired" connection. The mobile device 420 connects to network 460 using a wireless connection. A wireless connection is a connection that uses Radio Frequency (RF) signals, Infrared signals, or any other form of wireless signaling to connect to the network 460. In the example of this figure, the mobile device 420 is a mobile telephone. However, mobile device 420 may be a mobile phone, Personal Digital Assistant (PDA), a tablet, a smartphone, or any other type of device that connects to network 460 via wireless connection without departing from this invention.

As can readily be appreciated the specific computing system used to train and/or utilize models based on data with missing values is largely dependent upon the requirements of a given application and should not be considered as limited to any specific computing system(s) implementation.

2. MissAttention Element

Figure 5:
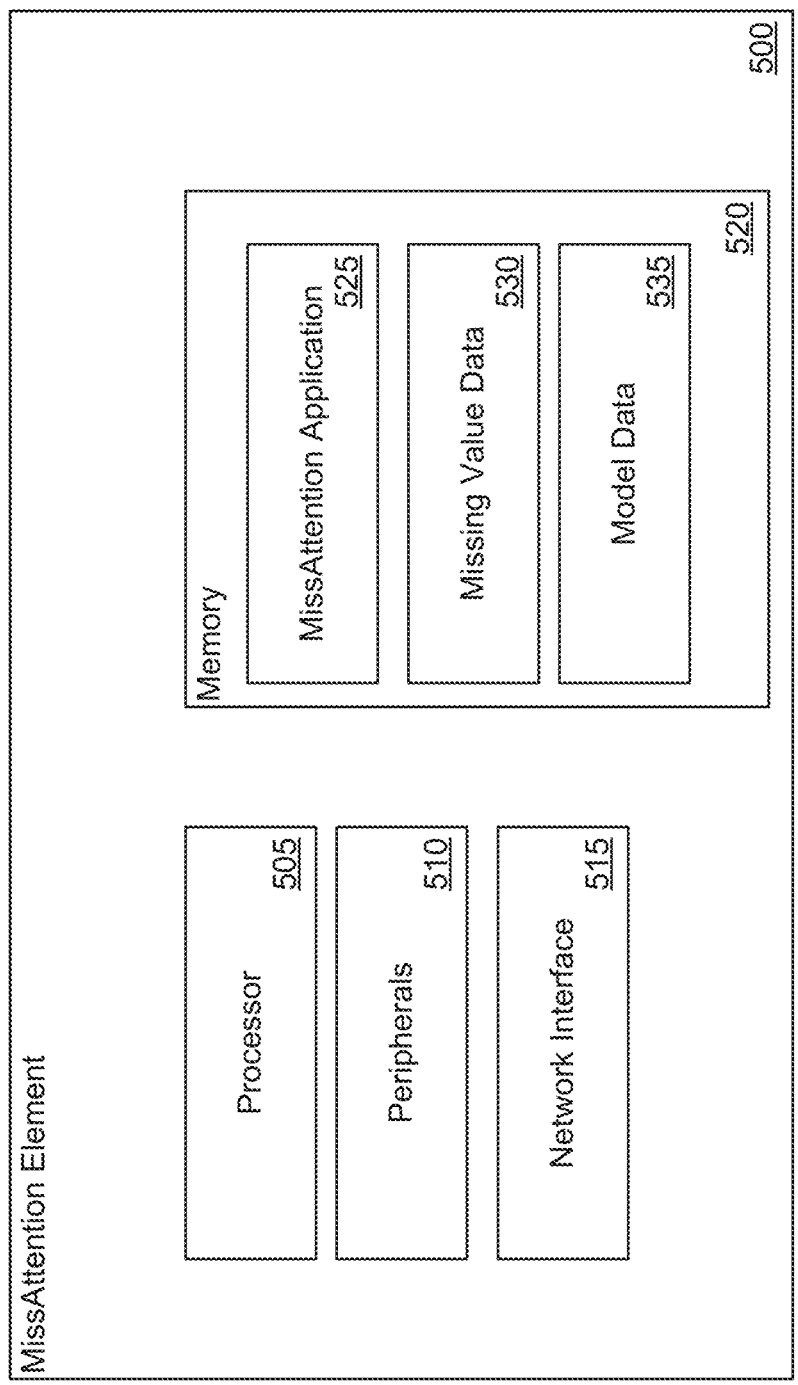
FIG. 5 illustrates an example of a MissAttention element that executes instructions to perform processes that train and/or utilize models based on data with missing values in accordance with an embodiment of the invention.

An example of a MissAttention element that executes instructions to perform processes that train and/or utilize models based on data with missing values in accordance with an embodiment of the invention is illustrated in FIG. 5. MissAttention elements in accordance with many embodiments of the invention can include (but are not limited to) one or more of mobile devices, cameras, and/or computers. MissAttention element 500 includes processor 505, peripherals 510, network interface 515, and memory 520. One skilled in the art will recognize that a MissAttention element may exclude certain components and/or include other components that are omitted for brevity without departing from this invention.

The processor 505 can include (but is not limited to) a processor, microprocessor, controller, or a combination of processors, microprocessor, and/or controllers that performs instructions stored in the memory 520 to manipulate data stored in the memory. Processor instructions can configure the processor 505 to perform processes in accordance with certain embodiments of the invention. In various embodiments, processor instructions can be stored on a non-transitory machine readable medium.

Peripherals 510 can include any of a variety of components for capturing data, such as (but not limited to) cameras, displays, and/or sensors. In a variety of embodiments, peripherals can be used to gather inputs and/or provide outputs. MissAttention element 500 can utilize network interface 515 to transmit and receive data over a network based upon the instructions performed by processor 505. Peripherals and/or network interfaces in accordance with many embodiments of the invention can be used to gather inputs that can be used to train and/or utilize models based on data with missing values.

Memory 520 includes a MissAttention application 525, missing value data 530, and model data 535. MissAttention applications in accordance with several embodiments of the invention can be used to train and/or utilize models based on data with missing values. An example of a MissAttention application in accordance with several embodiments of the invention is described in greater detail below.

Missing value data in accordance with a variety of embodiments of the invention can include various types of data that may be missing values for certain features, such as (but not limited to) medical data, time series data, marketing data, recommendation data, etc.

In several embodiments, model data can store various parameters and/or weights for various models or MissAttention layers that can be used for various processes as described in this specification. Model data in accordance with many embodiments of the invention can be updated through training on missing value data captured on a MissAttention element or can be trained remotely and updated at a MissAttention element.

Although a specific example of a MissAttention element 500 is illustrated in this figure, any of a variety of MissAttention elements can be utilized to perform processes for generating dense representations of inputs with missing values similar to those described herein as appropriate to the requirements of specific applications in accordance with embodiments of the invention.

3. MissAttention Application

Figure 6:
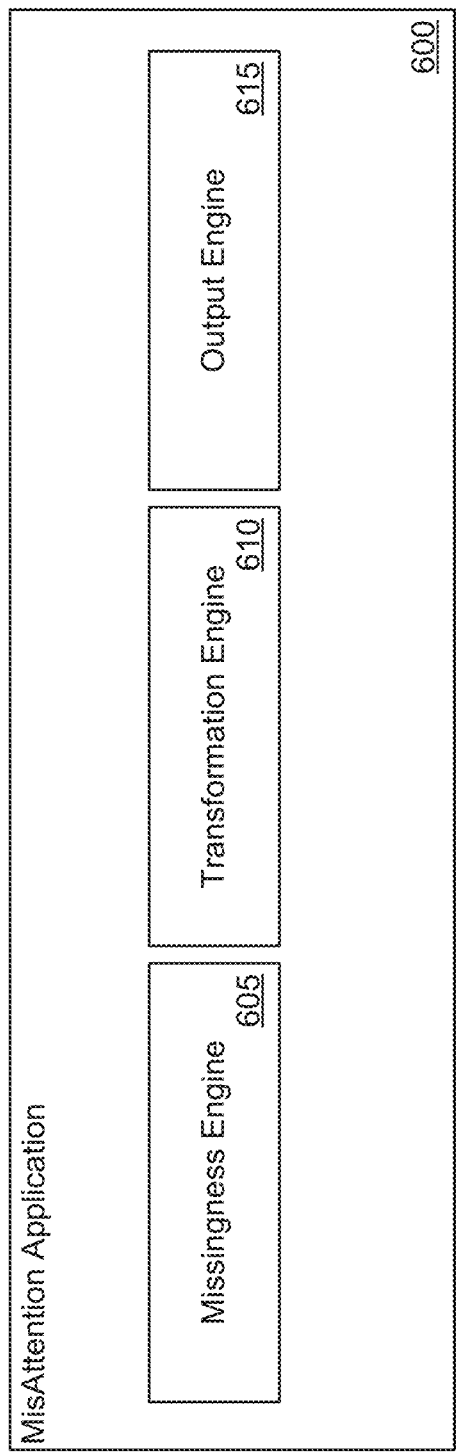
FIG. 6 illustrates an example of a MissAttention application for generating dense representations of inputs with missing values in accordance with an embodiment of the invention.

An example of a MissAttention application for generating dense representations of inputs with missing values in accordance with an embodiment of the invention is illustrated in FIG. 6. MissAttention application 600 includes missingness engine 605, transformation engine 610, and output engine 615. One skilled in the art will recognize that a MissAttention application may exclude certain components and/or include other components that are omitted for brevity without departing from this invention. Missingness engines in accordance with various embodiments of the invention determine missingness as described throughout this specification. In many embodiments, transformation engines transform inputs to dense representations based on missingness, as described throughout this description. Output engines in accordance with several embodiments of the invention can provide a variety of outputs to a user, including (but not limited to) dense representations of inputs that are missing values. Dense representations in accordance with several embodiments of the invention can serve as inputs to additional layers of a model.

Although a specific example of a MissAttention application is illustrated in this figure, any of a variety of MissAttention applications can be utilized to perform processes for generating dense representations of inputs with missing values similar to those described herein as appropriate to the requirements of specific applications in accordance with embodiments of the invention.

Although specific methods of generating dense representations of inputs with missing values are discussed above, many different methods of generating dense representations of inputs with missing values can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for generating representations of inputs with missing values, the method comprising:
    at a single layer in a multi-layer model:
        receiving an input comprising a set of one or more values for a plurality of features;
        identifying a missingness pattern of the input, wherein the missingness pattern indicates whether the set of values is missing a value for each of the plurality of features;
        determining a set of one or more transformation weights based on the missingness pattern; and
        transforming the input based on the determined transformation weights.

2. The method of claim 1, wherein determining a set of transformation weights based on the missingness pattern comprises utilizing a set of one or more attention weights.

3. The method of claim 1, wherein the missingness pattern is a binary vector.

4. The method of claim 1, wherein transforming the input is further based on an offset that depends on the missingness pattern.

5. The method of claim 1, wherein determining the set of transformation weights comprises scaling the set of transformation weights.

6. The method of claim 1, wherein transforming the input comprises linearly mixing the missingness pattern with a fixed linear transformation.

7. The method of claim 1 further comprising updating a model based on the transformed input.

8. The method of claim 1 further comprising generating a predictive output based on the transformed input.

9. A non-transitory machine readable medium containing processor instructions for generating representations of inputs with missing values, where execution of the instructions by a processor causes the processor to perform a process that comprises:
    at a single layer in a multi-layer model:
        receiving an input comprising a set of one or more values for a plurality of features;
        identifying a missingness pattern of the input, wherein the missingness pattern indicates whether the set of values is missing a value for each of the plurality of features;
        determining a set of one or more transformation weights based on the missingness pattern; and
        transforming the input based on the determined transformation weights.

10. The non-transitory machine readable medium of claim 9, wherein determining a set of transformation weights based on the missingness pattern comprises utilizing a set of one or more attention weights.

11. The non-transitory machine readable medium of claim 9, wherein the missingness pattern is a binary vector.

12. The non-transitory machine readable medium of claim 9, wherein transforming the input is further based on an offset that depends on the missingness pattern.

13. The non-transitory machine readable medium of claim 9, wherein determining the set of transformation weights comprises scaling the set of transformation weights.

14. The non-transitory machine readable medium of claim 9, wherein transforming the input comprises linearly mixing the missingness pattern with a fixed linear transformation.

15. The non-transitory machine readable medium of claim 9, wherein the process further comprises updating a model based on the transformed input.

16. The non-transitory machine readable medium of claim 9, wherein the process further comprises generating a predictive output based on the transformed input.

* * * * *